United States Patent [19]

Young

[11] Patent Number: 5,184,656
[45] Date of Patent: Feb. 9, 1993

[54] METHOD OF CUTTING FROND STUBS FROM A DATE PALM

[76] Inventor: Darl E. Young, 82849 Lexington Ave., Indio, Calif. 92201

[21] Appl. No.: 794,572

[22] Filed: Nov. 19, 1991

[51] Int. Cl.⁵ .................. B27B 1/00; A01G 23/00
[52] U.S. Cl. ............................. 144/363; 30/353;
 47/101; 47/8; 47/58; 144/2 Z; 144/208 C;
 144/340; 144/343
[58] Field of Search ............. 144/2 Z, 208 R, 208 C,
 144/340, 343, 356, 363; 30/353; 294/2, 4 S, 54
 S, 5 S; 47/1.01, 8, 58

[56] References Cited

U.S. PATENT DOCUMENTS

| | | | |
|---|---|---|---|
| 2,504,856 | 4/1950 | Luplow | 47/1.01 |
| 2,650,530 | 9/1953 | Schmidt | 47/1.01 |
| 2,768,437 | 10/1956 | Ronjan et al. | 30/121 |
| 2,813,278 | 11/1957 | Stecher et al. | 7/14.1 |
| 2,871,620 | 2/1959 | Bathe | 47/1.01 |

OTHER PUBLICATIONS

An advertisement for trees from the Feb. 1990 issue of "Plant Finder Magazine" published by Betrock Information Systems.
An advertisement for trees from the Mar. 1990 issue of "Plant Finder Magazine" published betrock Information Systems.
An advertisement for trees from the Apr. 1990 issue of "Plant Finder Magazine" published by Betrock Information Systems.
An advertisement for trees from the May 1990 issue of "Plant Finder Magazine" published by Berock Information Systems.
An advertisement for trees from the Jun. 1990 issue of "Plant Finder Magazine" published by Betrock Information Systems.
An advertisement for trees from the Jul. 1990 issue of "Plant Finder Magazine" published by Betrock Information Systems.
An advertisement for trees from the Apr. 1991 issue of "Plant Finder Magazine" published by Betrock Information Systems.
An advertisement for trees from the May 1991 issue of "Plant Finder Magazine" published by Betrock Information Systems.
An advertisement for trees from the Jun. 1991 issue of "Plant Finder Magazine" published by Betrock Information Systems.
An advertisement for trees from the Jul. 1991 issue of "Plant Finder Magazine" published by Betrock Information Systems.
An advertisement for trees from the Aug. 1991 issue of "Plant Finder Magazine" published by Betrock Information Systems.
An advertisement for trees from the Sep. 1991 issue of "Plant Finder Magazine" published by Betrock Information Systems.
An advertisement for trees from the Feb. 1990 issue of "Southern Nurseryman's Digest" published by Betrock Information Systems.
An advertisement for trees from the Apr. 1990 issue of "Southern Nurseryman's Digest" published by Betrock Information Systems.
An advertisement for trees from the May 1990 issue of "Southern Nurseryman's Digest" published by Berock Information Systems.
An advertisement for trees from the Sep. 1991 issue of "Southern Nurseryman's Digest" published by Betrock Information systems.
Article Entitled Date Development, Handling and Packing in the United States, Agricultural Handbook No. 482.
Article Entitled Growing Dates in the United States, by Roy W. Nixon and J. B. Carpenter.

Primary Examiner—W. Donald Bray
Attorney, Agent, or Firm—Christie, Parker & Hale

[57] ABSTRACT

A method of cutting frond stubs of a date palm tree to produce a palm bark surface free of pockets where water can collect and which reduces the possibility of pathogen intrusion and proliferation is described using a cutting tool with a sharp straight edge to produce a geometric shape.

7 Claims, 5 Drawing Sheets

METHOD OF CUTTING FROND STUBS FROM A DATE PALM

CROSS REFERENCE TO RELATED APPLICATIONS

This application is related to U..S. patent application Ser. No. 07/562,913, now abandoned, filed Jul. 30, 1990, U.S. patent application Ser. No. 07/676,260, filed Mar. 27, 1991, now U.S. Pat. No. 5,092,380 design patent application Ser. No. 07/676,722, filed Mar. 27, 1991.

BACKGROUND OF THE INVENTION

1. Field of the Invention Process

This process involves the cleaning and shaping of the trunk of a date palm to prepare it for transplanting; more specifically to properly protect and bring out the true natural beauty of this exotic desert tree. Still more particularly, the invention involves cleaning and shaping the trunk of a date palm by a process which does not penetrate the fibrous exterior surrounding the vascular tissue or leave pockets in which water can collect.

2. Prior Art

Palm tree nurseries and landscapers dig around the root ball of a palm and gently lay it on the ground to prepare it for transplanting. The palm has many frond stubs (leaf bases) from fronds that have died and broken off. The rough, ragged look is not desirable.

For years the accepted procedure has been to use a chain saw to remove these old frond stubs, i.e., leaf bases. As the palm lay on the ground the operator would cut off these very wide stubs which often reaches 10" to 12" on a medium size palm with a trunk diameter of 18", many times cutting into the live wood of the palm's trunk, i.e., the fibrous exterior, and injuring the tree and exposing the vascular tissue to possible entry of pathogens which could kill the palm in a humid environment such as in Florida or near the coast. Furthermore, the weight and power of the chain saw, as well as the odd positions that the saw has to be held in to remove the top, side and bottom stubs of the palm trunk by over cutting with the chain saw blade makes cutting these leaf bases difficult. Other landscapers have used circular saws, hand saws and bow saws with the same damaging result to the palm. Historically, this also weakened the palm, and the resulting perpendicular cut to the palm trunk did not produce a natural appearing weathered look. Even the name given this chain saw cut—"step cut"—implies an unnatural configuration. The very design of a saw blade of this type makes nature's natural look difficult, if not impossible to achieve. These old procedures are still used today throughout the industry in the palm growing areas of the United States. For years a better tools and processes were needed and sought after.

Spanish missionaries introduced the date palm into the Western hemisphere by planting date seeds around early missions. From this origin, the date palm, which is known botanically as "Phoenix Dactylifera L." has become a very important part of agricultural production in southwestern United States where a significant crop of date fruit is produced annually. Although date palms may be grown from seeds, primary production is by rooting offshoots that develop from axillary buds on the tree trunk, chiefly during the early years of the palm tree's life. Removal of the offshoots generally takes place after the tree has started to produce a second generation of offshoots. The size of the offshoots when ready for cutting generally varies from 40 to 100 pounds in weight and from 8 to 14 inches in diameter.

As a general rule, green leaves are not removed from an offshoot until it is cut from the parent palm unless the palm is crowded with offshoots. The leaves on the smaller offshoots are sometimes cut back close to the bud to retard growth. The cutting of an offshoot from the parent palm requires care and skill to avoid injury to either the offshoot or the host tree. A specially designed chisel with a rectangular cutting blade is generally used to cut the offshoot. The blade of the tool has one flat side and the other beveled so as to form three sharp cutting edges.

Another important use of the date palm in Southwestern United States has been as an ornamental. The date palm is also rapidly becoming a desirable ornamental in Florida. These palms which can grow quite tall generally obtain maximum leaf spread after 12 to 15 years of age. Frequently older palms retain more leaves than are needed either for fruit production or for an attractive appearance. As many as 180 green leaves have been counted on a single palm unpruned for six years. A considerable number of such leaves will be below the fruit bunches or will present a comparatively unattractive appearance where the palm is used for ornamental purposes. Furthermore, excess lower leaves may increase the relative humidity around the fruit bunches in mid summer, adversely affecting the fruit harvest and this problem is exacerbated in humid climates as in Florida. It also occurs that older leaves or fronds dry and die as the tree ages and may break off leaving unsightly stubs. This is especially undesirable where the tree is to be used for ornamental purposes. Dead or partly dead leaves may be removed at any convenient time but because of greater ease in cutting they are generally removed before becoming hard or drying.

In addition to the foregoing, it has also been recommended to remove the fronds of previous years growth to facilitate pollination and subsequent handling of fruit bunches. For this purpose, a sharp pruning knife with a long curved blade mounted on the handle is most frequently used. The curved blade is a planar surface resembling a curved end carpet cutting knife but of larger size. A cutting tool of this type used in the manner described simply results in a flat cut leaf edge.

As date palms become large and the fronds sturdy and strong, their removal is primarily accomplished by means of a chain saw. Although chain saw removal of fronds or stubs of fronds may be effective, it suffers from the disadvantages of leaving pockets in which water can collect and a frond stub cut surface which is unsightly and unattractive and causes wounds in the vascular tissue of the palm which allow subsequently developing pathogens access to the mere stem. Moreover, because of the toughness of the fronds, chain saw use requires frequent expensive replacement of the chain saw blades as they become dull or break.

The present invention provides a method of cutting the date palm leaf base, i.e, frond stub, which avoids the disadvantages of the techniques heretofore known and results in a date palm bark surface of unusually attractive appearance and which avoids the possibility of the type of injury that would allow entry of dangerous and damaging pathogens.

SUMMARY OF THE INVENTION

The principal object of my new process is to trim off the palm tree fronds and frond stubs with a sharp straight cutting edge to produce a triangular shape and to create a desireable appearance without injuring the tree.

In my aforementioned prior patent applications I described a process which utilized a rounded cutting tool, i.e., a cutting tool with a convex cutting edge to sever the fronds and frond stubs.

It has now been discovered that it is also possible to use a cutting tool with a straight cutting edge to sever the fronds without injury to the fibrous exterior surrounding the vascular tissue of the tree and produce an attractive tree trunk. Although the final appearance of the tree trunk cut with a straight cutting edge is different, it is nonetheless also attractive and, moreover, also enables the frond stub to be severed in such a manner that no pocket is left on the palm bark surface in which water can collect.

By using a sharp edged cutting tool, e.g., a cutting tool with a straight cutting edge, we are able to remove the frond stub with a straight or direct cutting motion to produce a substantially linear sided, geometric shape without cutting through the palm tree's fibrous exterior and damaging the vascular tissue and without leaving a pocket or surface in which water can collect.

It has been determined by tests conducted in Florida that frond-removing cuts made horizontally, such as with a chain saw, leave a flat or other shaped fiber surface, referred to herein as a "pocket", exposed directly upward in which water can collect. The pocket collects water and consequently encourages the growth of a fungal wood rotting disease (identified as Thielaviposis Paradoxa). This very damaging pathogen then enters the vascular tissue of the palm through the adjacent wound which is inadvertably created as a by-product of the use of any kind of saw. The wood rot begins at the periphery of the trunk at the point of the leaf base attachment and progresses inward. The stress caused by this disease encourages a secondary infestation by bark beetles. Several species of insects and nematodes have been found in samples.

It has been determined that the best long term solution is to properly cut all the leaf bases so that no water-collecting zone is formed. Where a substantially linear shaped surface appearance is desired, this is done by cutting the leaf base at an angle which is 30° to 70°, preferably 30° to 45°, from the trunk in a generally triangular shape. This angled cut allows water to run off rather than collect in the fibers. Further, by virtue of using a tool without saw teeth, such as in the present invention, the tool and process does not allow cuts into the vascular tissue.

Thus, cutting the palm in accordance with the invention is important to avoid the risk of damage caused by pathogens, as described.

In accordance with a preferred embodiment of the present invention there is provided a method of cutting stubs of fronds from a date palm to produce an attractive geometric bark surface that resists pathogen infestation. The method involves severing the frond stubs without penetrating the vascular tissue and without leaving a flat horizontal surface where water can collect. The preferred method comprises providing a cutting tool having a frontally disposed cutting means with a straight cutting edge. The term "straight cutting edge" as used herein is intended to include serrated cutting edges. The frond stub is severed by engaging the stub with the cutting edge of the cutting means in a straight or direct cutting motion with sufficient force to sever at least a portion of the frond stub. The engagement is repeated, as necessary, to achieve the desired geometric shape and to completely sever the frond stub without damaging the vascular tissue of the palm following the circumference of the tree. The cutting tool, during engagement with the frond stub, is oriented with the straight cutting edge at an angle to achieve any desired geometric shape in the palm trunk surface. This results in formation of an attractive substantially linear sided geometric pattern, e.g., substantially triangular, on the palm bark surface. Cutting the frond stubs around the circumference of the tree can also be done in such a way to result in an attractive climbing geometrical spiral. The process does not damage the vascular tissue of the tree under the fibrous exterior and a healthy and beautiful palm results which resists pathogen infestation.

DETAILED DESCRIPTION OF PREFERRED EMBODIMENT

Figure 1:
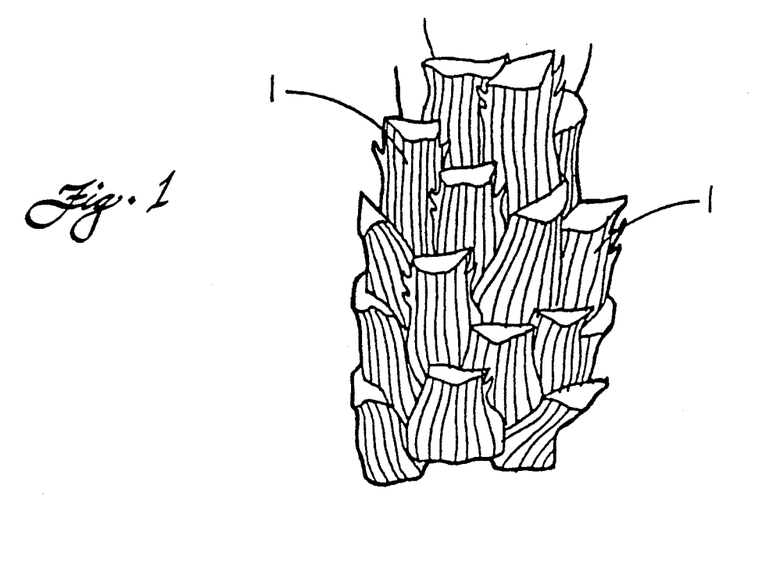
FIG. 1 is a schematic perspective view illustrating the bark appearance after the fronds have may have died and broken off by their weight and the wind.
Figure 2:
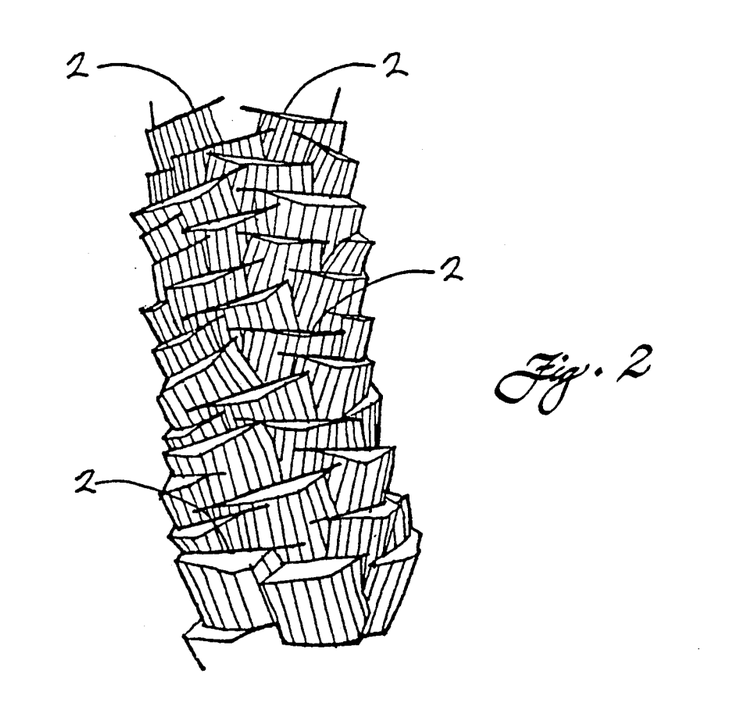
FIG. 2 is a schematic perspective view illustrating the bark appearance after the frond stubs are cut with a chain saw, the old chain saw or "step cut" that is currently in use today, (FIG. 2 displays the many possible cuts into the tree's fibrous exterior by the chain saw)

When preparing date palms for ornamental use, the frond stubs of the date palm are most advantageously cut, i.e., severed by removing the palm from the ground and laying it horizontally where it may be cleaned and prepared for shipment. A frond stub extends outward from the trunk of the palm bending upwards toward the top of the palm (FIG. 1). We proceed to cut and remove the stub, starting about four inches above the base of the stub where it joins the palm. The stub is advantageously cut at an angle of about 30° to 70°, preferably 30° to 45°, towards the top of the palm on both sides of the frond stub following the circumference of the trunk of the palm to form a substantially triangular shape. The frond stub extends outwardly from the trunk of the palm bending towards the palm top. This can be seen in FIG. 1 where numeral 1 indicates the frond stubs of the palm bark surface. Prior to the present invention the frond stubs were cut using a chain saw.

Figure 3:
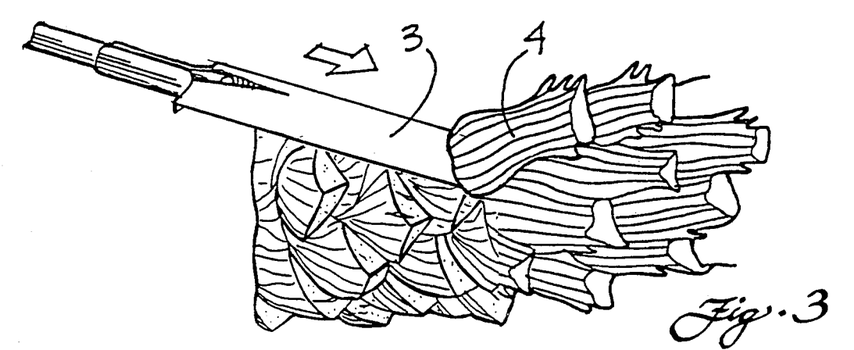
FIG. 3 is a schematic perspective view illustrating the removal of a frond stub with a sharp straight cutting edge.

Using a tool 3 with a straight cutting edge, as seen in FIG. 3, the frond stub 4 shown therein is severed at about four inches above the base of the stub where it joins the palm. The stub is cut by engaging it with the cutting tool in a direct or forward direction with sufficient force to sever at least a portion of the frond or frond stub by an upward motion, as aforesaid, preferably at an upward angle of about 30° to 70° toward the top of the palm, as shown, following around the circumference of the palm trunk. The frond stub is engaged with the cutting tool as many times as necessary to completely sever the leaf base from the palm trunk and produce the desired geometric shape. Using the technique described, the frond stub is severed without any damage to the vascular tissue of the palm such as generally occurs using chain saws and without leaving a water-collecting pocket.

Figure 5:
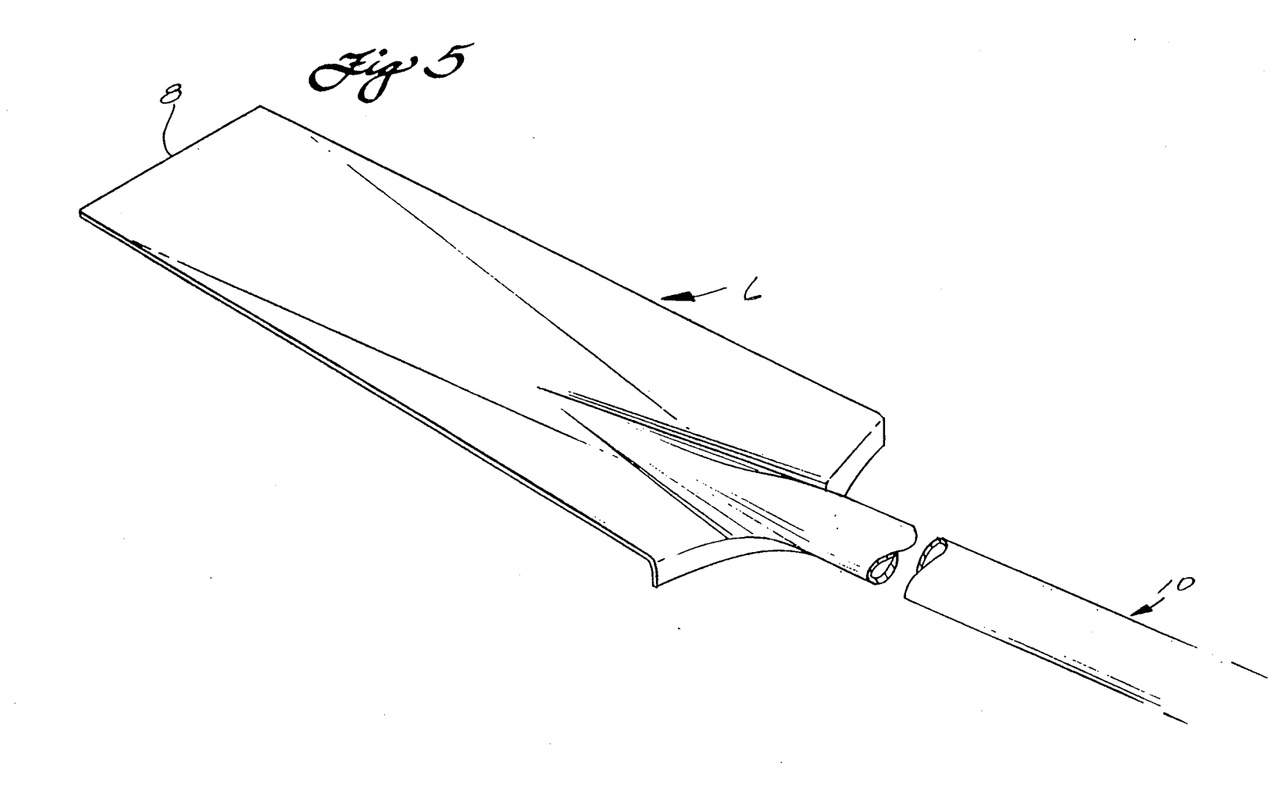
FIG. 5 is a perspective view of a presently preferred cutting tool illustrating the straight cutting edge of the cutting tool.

A preferred cutting tool is shown in FIG. 5. As can be seen, the cutting tool comprises a cutting means 6 and a support 10 therefor, which may extend rearwardly as shown or sidewardly (not shown).

Figure 4:
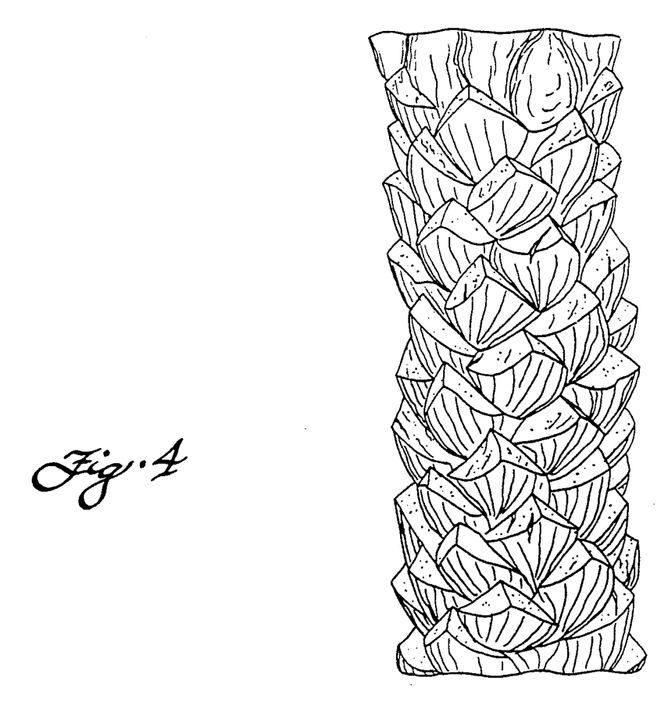
FIG. 4 is a schematic perspective view illustrating the palm bark surface after removal of the frond stub by the method of the invention.
Figure 6:
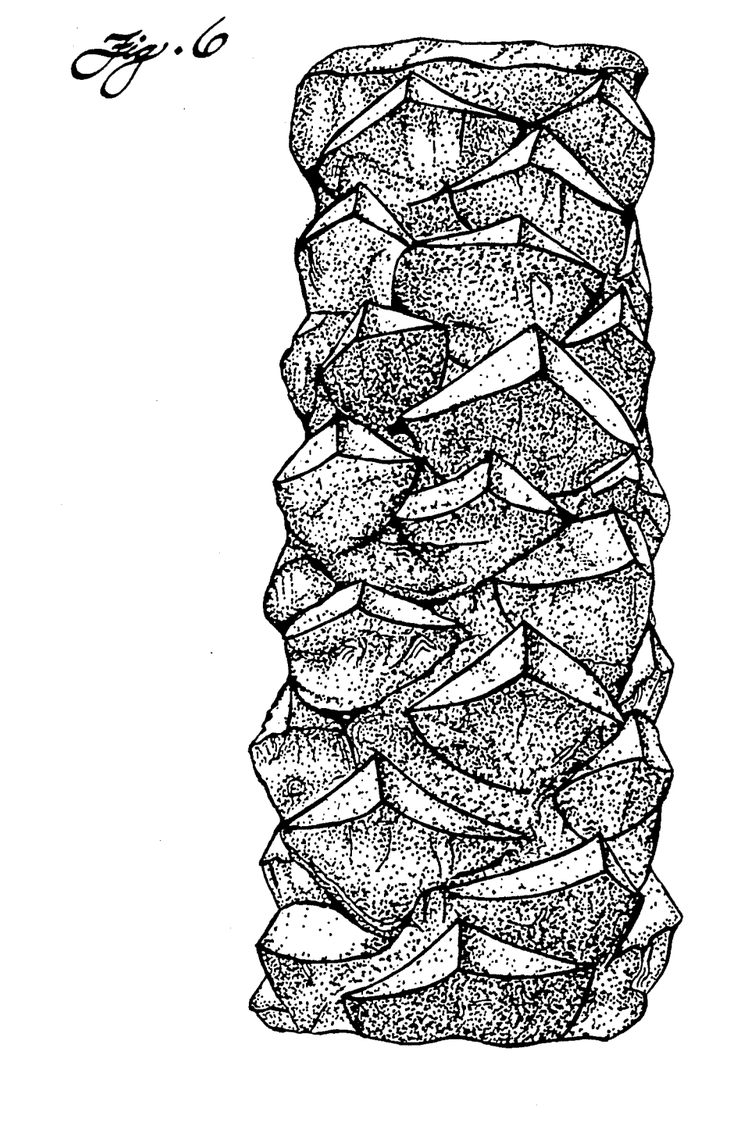
FIG. 6 is a perspective view of a segment of the palm trunk showing the attractive geometric appearance made possible by practicing the invention.
Figure 7:
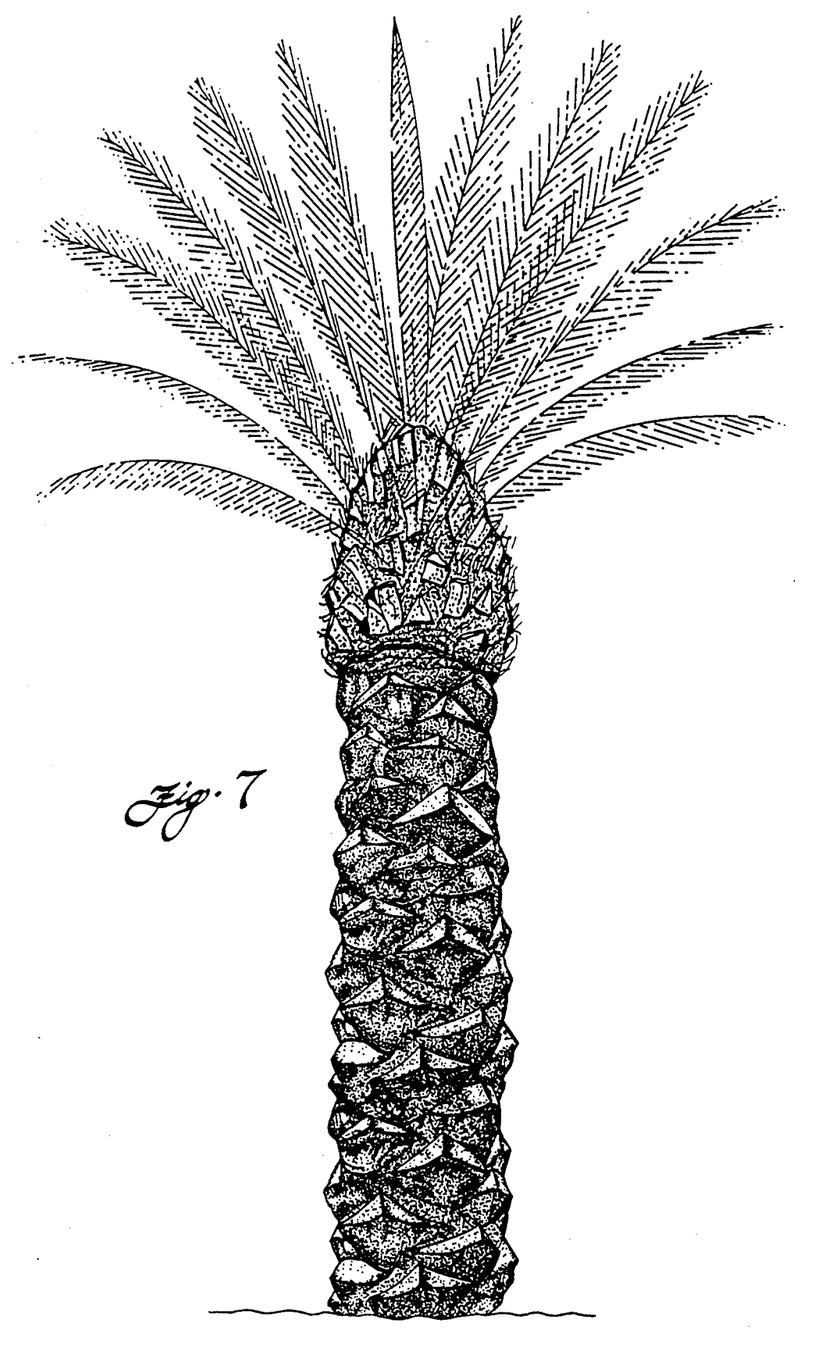
FIG. 7 is a perspective view of the whole palm.

The palm bark appearance after cutting in accordance with this embodiment of the invention is shown schematically in FIG. 4, and as well as in FIGS. 6 and 7. As can be seen, practice of the method of the invention produces an attractive appearance. The climbing spiral growth of the date palm is shown beautifully and the palm becomes an attractive ornamental addition to the landscape.

Further note that the new process does not damage the fibrous exterior of the palm, nor cause wounds into the vascular tissue and a healthy and beautiful palm is the result.

It is apparent from the foregoing that various changes and modifications may be made without departing from the spirit of the invention. Accordingly, the scope of the invention should be limited only by the appended claims wherein what is claimed is:

1. A method of cutting frond stubs from a date palm having a palm bark surface to reduce the possibility of pathogen infestation and damage therefrom comprising:
   providing a cutting tool with a sharp cutting edge;
   engaging each frond stub to be severed with the cutting edge of said cutting tool with sufficient force in a direction toward the palm to sever said frond stub without leaving a pocket in which water can collect and remain and without penetrating the vascular tissue beneath the fibrous exterior of the palm and repeating said engagement as necessary, following the circumference of the tree, to completely sever the frond stub.

2. A method according to claim 1 wherein said frond stub to be severed is engaged by the cutting edge with an upwardly directed cutting motion.

3. A method according to claim 2 wherein said cutting motion is at an angle of about 30° to 70° on each side of the frond stub.

4. A method according to claim 3 wherein said frond stub is engaged at about four inches above the base of the frond stub where it joins the palm.

5. A date palm produced by the method of claim 1 free of pockets on the palm bark surface in which water can collect and free of penetrations into the vascular tissue of the palm.

6. A method of cutting frond stubs from a date palm having a palm bark surface to reduce the possibility of pathogen infestation and damage therefrom comprising:
   providing a cutting tool with a sharp straight edge;
   engaging each frond stub to be severed with the straight edge of said cutting tool with an upwardly directed cutting motion at an angle of about 30° to 45° on each side of the frond stub with sufficient force to sever said frond stub and produce a substantially triangular shape and repeating said engagement as necessary, following the circumference of the tree, to completely sever the frond stub without penetrating the vascular tissue beneath the fibrous exterior of the palm.

7. A method according to claim 6 wherein said frond stub is engaged at about four inches above the base of the frond stub where it joins the tree.

* * * * *

UNITED STATES PATENT AND TRADEMARK OFFICE
CERTIFICATE OF CORRECTION

PATENT NO. : 5,184,656

DATED : February 9, 1993

INVENTOR(S) : Darl E. Young

It is certified that error appears in the above-identified patent and that said Letters Patent is hereby corrected as shown below:

On the title Page:

[56] References Cited, OTHER PUBLICATIONS, line 5, change "betrock Information Systems" to -- Betrock Information Systems --.

[56] References Cited, OTHER PUBLICATIONS, line 44, change "Berock Information Systems" to -- Betrock Information Systems --.

Column 1, line 14, after "Invention" delete "Process".
Column 1, line 54, after "years" delete "a".
Column 1, line 61, change "southwestern" to -- Southwestern --.

Column 2, line 30, change "mid summer" to -- mid-summer --.

Column 3, line 6, change "desireable" to -- desirable --.
Column 3, line 38, change "inadvertably" to -- inadvertently --.

UNITED STATES PATENT AND TRADEMARK OFFICE
CERTIFICATE OF CORRECTION

PATENT NO. : 5,184,656

DATED : February 9, 1993

INVENTOR(S) : Darl E. Young

It is certified that error appears in the above-identified patent and that said Letters Patent is hereby corrected as shown below:

```
Column 4, line 25, after "fronds" delete "have".
Column 4, line 30, after "today" delete the comma.
```

Signed and Sealed this

Fourth Day of January, 1994

Attest:

BRUCE LEHMAN

*Attesting Officer*           *Commissioner of Patents and Trademarks*